United States Patent [19]
Yokoyama et al.

[11] Patent Number: 5,713,501
[45] Date of Patent: Feb. 3, 1998

[54] AUTOMOBILE HAVING SPARE TIRE CARRIER WITH LOCK MECHANISM INCLUDING REAR DOOR BOTTOM PANEL SUPPORT

[75] Inventors: Takeshi Yokoyama; Katsuhiro Watanabe, both of Tokyo; Yukio Matsuda, Aichi-ken, all of Japan

[73] Assignees: Hino Jidosha Kogyo Kabushiki Kaisha, Tokyo; Toyota Jidosha Kabushiki Kaisha, Aichi-ken, both of Japan

[21] Appl. No.: 661,568

[22] Filed: Jun. 11, 1996

[30] Foreign Application Priority Data

Jun. 30, 1995 [JP] Japan .................. 7-186651

[51] Int. Cl.⁶ .................................................. B62D 43/02
[52] U.S. Cl. ...................... 224/517; 224/42.21; 224/509
[58] Field of Search ...................... 224/401, 509, 224/506, 507, 517, 42.21, 42.25, 42.24; 296/37.2

[56] References Cited

U.S. PATENT DOCUMENTS

| | | |
|---|---|---|
| 4,756,457 | 7/1988 | Polk ................................ 224/517 X |
| 4,817,834 | 4/1989 | Weiler . |
| 4,946,084 | 8/1990 | Britto . |
| 5,104,015 | 4/1992 | Johnson ........................... 224/509 X |
| 5,186,371 | 2/1993 | Jozefczak et al. . |
| 5,333,766 | 8/1994 | Fisher . |

FOREIGN PATENT DOCUMENTS

| | | |
|---|---|---|
| 63-58080 | 4/1988 | Japan . |
| 5-94070 | 12/1993 | Japan . |
| 406099860 | 4/1994 | Japan ................................. 24/509 |

*Primary Examiner*—Renee S. Luebke
*Attorney, Agent, or Firm*—Jordan and Hamburg

[57] ABSTRACT

An automobile comprises a carrier lock device associated with the spare tire carrier, a striker associated with a back door and engaged by the carrier lock device, and a carrier lock reinforcement supporting the striker firmly and fixed to the back door. The carrier lock reinforcement is secured to the inner panel part constituting the lower side part of the back door, and the carrier striker fixed to the reinforcement is passed through the outer panel of the back door and projects backwardly.

13 Claims, 10 Drawing Sheets

AUTOMOBILE HAVING SPARE TIRE CARRIER WITH LOCK MECHANISM INCLUDING REAR DOOR BOTTOM PANEL SUPPORT

BACKGROUND OF THE INVENTION

The present invention relates to an automobile having a back door pivotably supported for a closing and an opening operation at the rear of the automobile with a spare tire carrier engageable with the back door.

The above-mentioned type of automobile provided with the spare tire carrier which supports a spare tire has hitherto been known as disclosed in JPA-Hei-5-94070. Such a spare tire carrier is pivotably supported at a base end thereof for opening and closing operation. When the back door is closed, the spare tire carrier is at the back of the back door and is held in the closed position adjacent the back door. When the opening and closing operation of the back door is made, the spare tire carrier is pivotally moved from the closed position to an opened position so that it does not prevent the opening and closing operation of the back door.

When the spare tire carrier is in the closed position, a carrier lock device associated therewith engages a carrier striker provided at the back door side to thereby lock the spare tire carrier in its closed position.

Further, the back door has an outer panel located on the outer side of the body when it is in the closed position, and an inner panel located on the inner side of the body when in the same position and fixed to the outer panel. When the back door is in the closed position, a door lock device, associated with the back door, engages the door striker provided on the body side so that the back door is locked in its closed position. The door lock device is fixed to a door lock reinforcement secured to an inner panel part constituting the lower side portion of the door, when the back door is in the closed position.

In the conventional automobile, a carrier lock reinforcement is secured to the outer panel constituting the outer plate of the back door, in the center portion in the vertical direction, and the carrier striker is fixed to the carrier lock reinforcement substantially in the center thereof, while the carrier lock device is fixed to the spare tire carrier at the position corresponding to the carrier striker. Thus, when the spare tire carrier is brought into the closed position, the carrier lock device and the carrier striker engage to thereby lock the spare tire carrier in the closed position. At this time, a load is applied from the spare tire carrier side to the carrier striker which acts on the outer panel of the back door.

Since the outer panel of the back door is a flat plate-like member and relatively low in rigidity, the carrier lock reinforcement is secured to the outer panel for reinforcement so that permanent deformation of the outer panel of the back door is not caused by the above-mentioned load. Since the load applied from the spare tire carrier side to the outer panel side becomes rather large, the carrier lock reinforcement in the prior art is made with great plate thickness and size to increase the rigidity and strength thereof. The carrier lock reinforcement receives the load applied from the spare tire carrier side thereby preventing the outer panel of the back door from being permanently deformed by the load.

However, the large-sized carrier lock reinforcement described above results in disadvantages such as an increase in the total weight of an automobile as well as a rise in cost. Particularly, in the case where the back door is provided with a window pane, the carrier lock reinforcement must also be in the shape of a flat plate to avoid interference between the carrier lock reinforcement and the window pane. In order to increase the rigidity and strength of the flat plate carrier lock reinforcement, the plate thickness and size thereof must be made particularly great. Thus, an increase in the weight and cost of the automobile becomes an important problem.

SUMMARY OF THE INVENTION

An object of the invention is to provide an automobile which eliminates the above-mentioned disadvantages in the prior art by a simple construction.

In order to achieve the above-mentioned object, according to the present invention, there is provided an automobile which comprises:

a back door which is pivotably supported on a body for an opening and a closing operation and pivotal movement between a closed position, where a door opening of a back portion of the body is closed, and an opened position where the door opening is opened, said back door including an outer panel positioned on the outer side of the body in the closed position and an inner panel positioned on the inner side of the body inwardly of the outer panel, in the closed position, and fixed to the outer panel;

a spare tire carrier which is pivotably supported on the body for the opening and closing operation and pivotal movement between a closed position at the back of and adjacent to the back door, which is held in said closed position, and an opened position to which the spare tire carrier is pivotally moved from the closed position so as not to prevent the opening and closing operation of the back door;

a carrier lock device, associated with the spare tire carrier, which is adapted to engage a carrier striker associated with the back door side, when the spare tire carrier is held in the closed position, to thereby lock the spare tire carrier in its closed position; and a carrier lock reinforcement, to which the carrier striker is fixed, which is secured to the inner panel part constituting the lower side portion of the back door when the back door is held in the closed position, the carrier striker protruding backwardly in the situation of the back door being held in the closed position.

Since, according to the above-mentioned construction, the carrier lock reinforcement is secured to the inner panel part of the back door which has a high rigidity, permanent deformation of the back door can be prevented while the reinforcement is made smaller in size than that of the prior art, thereby allowing the cost and weight of the automobile to be reduced.

Further, in order to achieve the above-mentioned object, according to the present invention, there is provided an automobile which comprises:

a back door which is pivotably supported on a body for an opening and a closing operation and pivotal movement between a closed position, where a door opening of a back portion of the body is closed, and an opened position where the door opening is opened, the back door including an outer panel positioned on the outer side of the body and an inner panel positioned on the inner side of the body inwardly of the outer panel and fixed to the outer panel;

a spare tire carrier which is pivotably supported on the body for the opening and closing operation and pivotal movement between a closed position at the back of and adjacent to the back door, and an opened position to which the spare tire carrier is pivotally moved from the closed position so as not to prevent the opening and closing operation of the back door;

a carrier lock device, associated with the spare tire carrier, which is adapted to engage a carrier striker associated with the back door side when the spare tire carrier is in the closed position to thereby lock the spare tire carrier in its closed position;

a door lock device, associated with the back door, which is adapted to engage a door striker fixed to the body when the back door is held in the closed position to thereby lock the back door in its closed position;

a door lock reinforcement which is secured to said inner panel constituting the lower side portion of the back door and to which said door lock device is fixed; and a carrier lock reinforcement, to which the carrier striker is fixed, secured to the door lock reinforcement, the door lock device being fixed to both the door lock reinforcement and the carrier lock reinforcement, and the carrier striker protruding rearwardly of said back door.

The above-mentioned construction, in addition to the above-mentioned function and effects, carries the load from the spare tire carrier side applied to the back door in a direct way to the body by way of the door lock device or the like, thereby allowing the carrier lock reinforcement to be made smaller in size.

In each of the two automobiles as described above, the outer panel advantageously comprises an outer panel body formed with a through-hole at a portion of the lower part of the back door and an outer panel reinforcement positioned so as to close the through-hole of the outer panel body and secured to the outer panel body, the outer panel reinforcement being sandwiched between said carrier lock reinforcement positioned on the inner side of the back door and the carrier striker positioned on the outer side of the back door, with the carrier striker, carrier lock reinforcement and outer panel reinforcement being secured to each other.

According to this construction, a portion of the load applied from the spare tire carrier side to the carrier striker is transmitted also to the outer panel body by way of the outer panel reinforcement. This means that the load is transmitted to the inner panel part and the outer panel part in a distributed way, thereby allowing the carrier lock reinforcement or the door lock reinforcement to be made smaller in size and lighter in weight.

Moreover, in each of the two automobiles as described above, it is advantageous that both the carrier striker positioned on the outer side of said back door and the carrier lock reinforcement positioned on the inner side of said back door are disposed so as to hold the outer panel therebetween, with the carrier striker, outer panel and carrier lock reinforcement being secured to each other.

Also in this construction, a portion of the load applied from the spare tire carrier side to the carrier striker is transmitted also to the outer panel and the load is distributed, thereby allowing the carrier lock reinforcement to be made smaller in size and lighter in weight.

Moreover, in order to achieve the above-mentioned object, according to the present invention, there is provided an automobile which comprises:

a back door which is pivotably supported on a body for an opening and a closing operation and pivotal movement between a closed position where a door opening of the back portion of the body is closed and an opened position where the door opening is opened, the back door including an outer panel positioned on the outer side of the body and an inner panel positioned on the inner side of the body inwardly of the outer panel and fixed to the outer panel;

a spare tire carrier which is pivotably supported on the body for the opening and closing operation and pivotal movement between a closed position at the back of and adjacent to the back door at said closed position, and an opened position to which the spare tire carrier is pivotally moved from the closed position so as not to prevent the opening and closing operation of the back door;

a carrier lock device which is associated with the spare tire carrier and which is adapted to engage a carrier striker associated with the back door side, when the spare tire carrier is in the closed position, to thereby lock the spare tire carrier in its closed position;

a door lock device which is associated with the back door and which is adapted to engage a door striker fixed to the body, when the back door is in the closed position, to thereby lock the back door in its closed position;

a door lock reinforcement which is secured to the inner panel constituting the lower side portion of the back door and to which the door lock device is fixed;

the carrier striker being secured to the door lock reinforcement, the carrier striker protruding backwardly of the back door.

The above-mentioned construction, in addition to the above-mentioned function and effects, allows a reduction in the number of parts as well as a reduction in the cost of the automobile to be offered.

Further, in the above-described construction, the outer panel advantageously comprises an outer panel body formed with a through-hole at a lower portion, and an outer panel reinforcement positioned so as to close the through-hole of the outer panel body and secured to the outer panel body, the outer panel reinforcement being sandwiched between the door lock reinforcement positioned on the inner side of the back door and the carrier striker positioned on the outer side of the back door, with the carrier striker, door lock reinforcement and outer panel reinforcement being secured to each other.

According to this construction, a portion of the load applied from the spare tire carrier side to the carrier striker is transmitted to the outer panel body by way of the outer panel reinforcement. This means that the load is transmitted to the inner panel part and the outer panel in a distributed way, thus allowing the door lock reinforcement to be made smaller in size and lighter in weight.

Further, it is advantageous that both the carrier striker positioned on the outer side of the back door and the door lock reinforcement positioned on the inner side of the back door are positioned so as to hold the outer panel therebetween, with the carrier striker, outer panel and door lock reinforcement being secured to each other.

According to this construction, a portion of the load transmitted from the spare tire carrier side to the carrier striker is transmitted also to the outer panel and the load can be distributed, thus allowing the door lock reinforcement to be made smaller in size and lighter in weight.

BRIEF DESCRIPTION OF THE DRAWINGS

Other objects and aspects of the invention will become apparent from the following description of embodiments with reference to the accompanying drawings in which.

DETAILED DESCRIPTION OF THE INVENTION

Embodiments of the present invention are described below with reference to the drawings and, in addition, the construction of the prior art as described before will be clarified based on the drawings.

Figure 1:
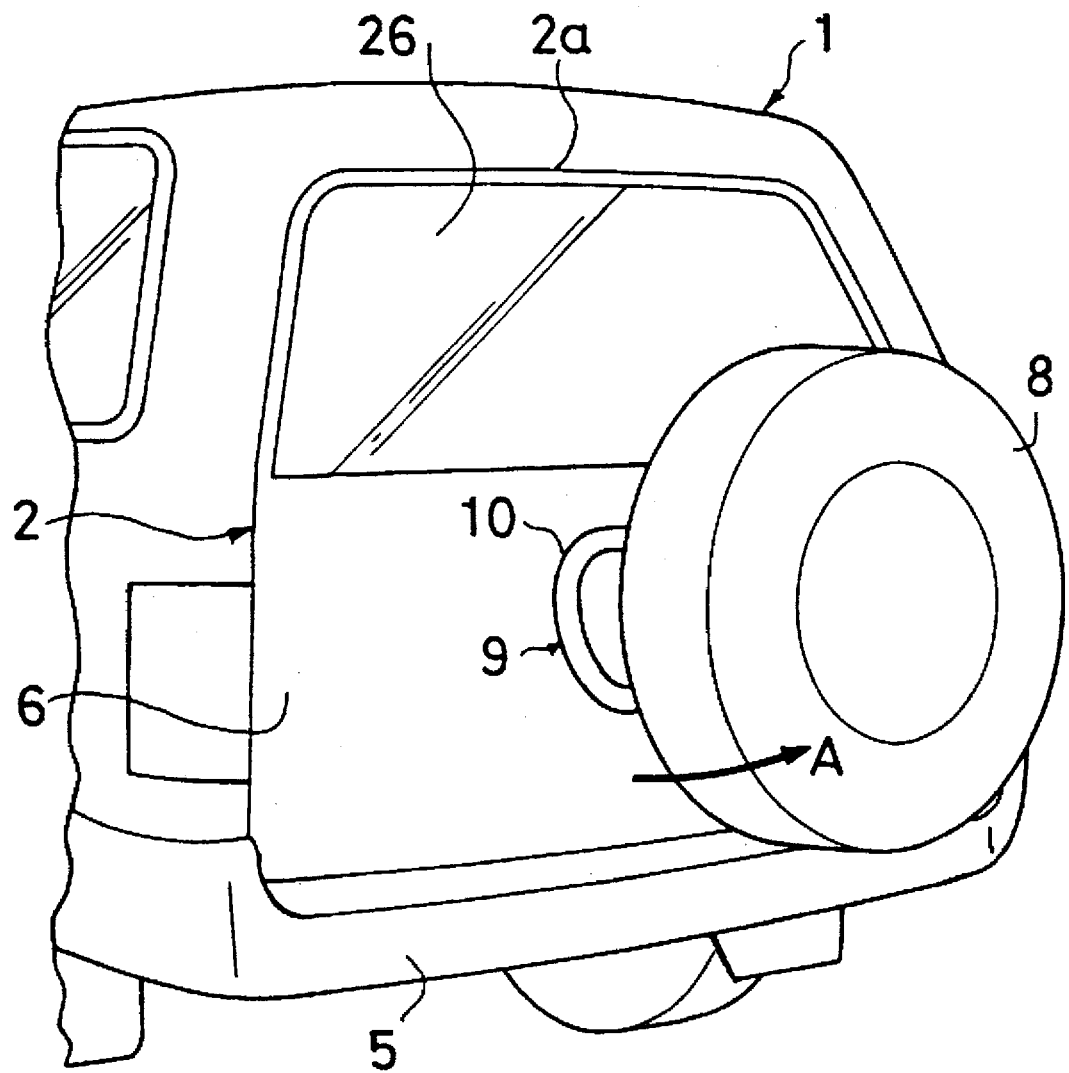
FIG. 1 is a perspective view showing an external appearance of an example of a back part of an automobile when a spare tire carrier is in the closed position.
Figure 2:
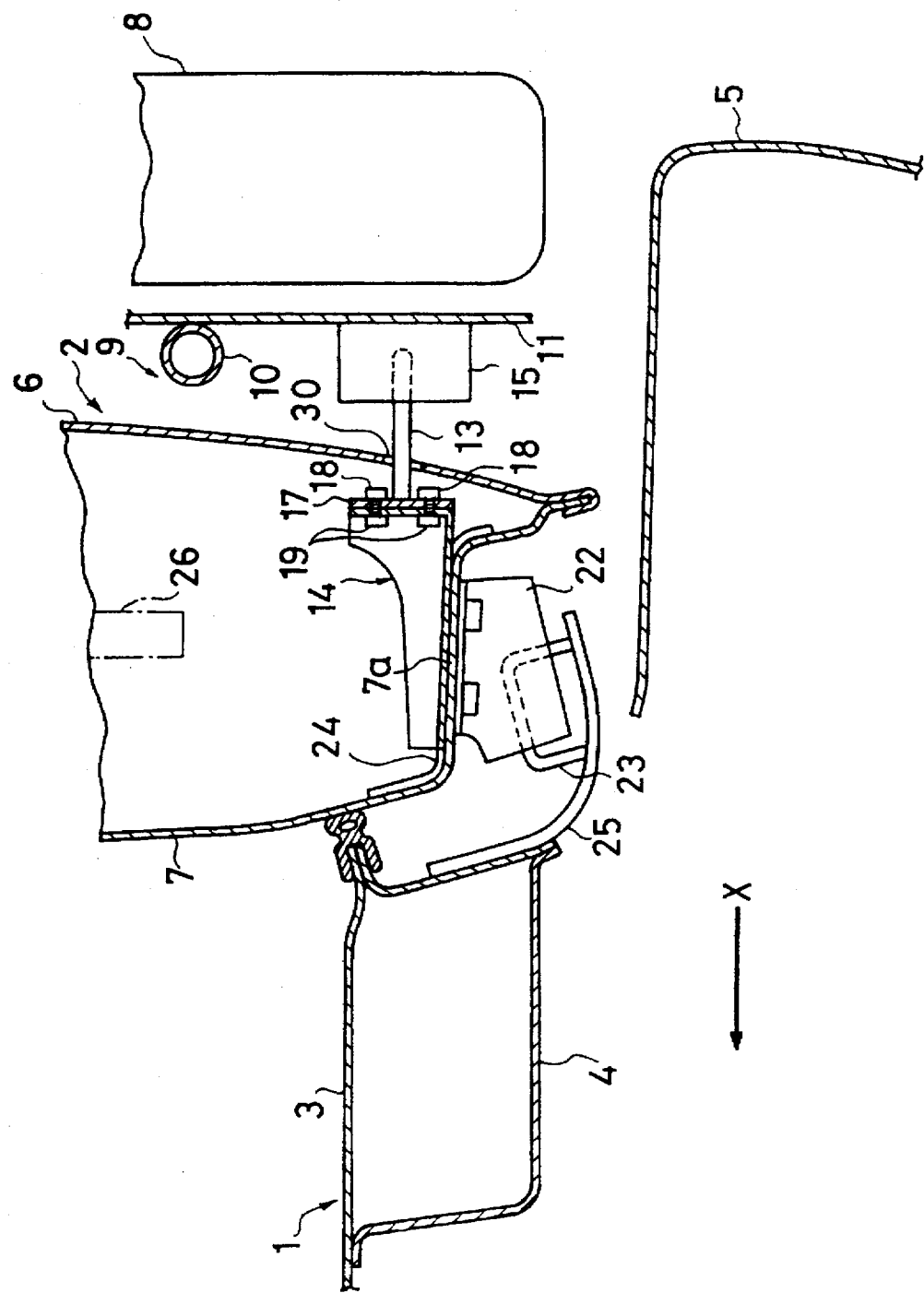
FIG. 2 is a vertical sectional view of FIG. 1.

FIG. 1 is a perspective view showing a back part of an automobile of an embodiment of the present invention, and FIG. 2 is a vertical sectional view of FIG. 1. A door opening at the back part of a body of the automobile shown therein is opened and closed by a back door 2. Namely, as shown in FIGS. 1 and 2, the upper part 2a of the back door 2 is pivotably supported by way of a hinge (not shown) for an opening and a closing operation in the arrow-marked direction "A" between the closed position where the door opening is closed and the opened position where the door opening is opened. Further, the illustrated back door 2 is provided with a window pane 26 which can be moved up and down, and the situation when the window pane is moved downwardly to the lowest position is shown with a chain line in FIG. 2 (shown also in FIG. 6 to FIG. 10).

As shown in FIG. 2, the body 1 comprises a floor panel 3 constituting the floor surface and a cross sill 4 as a reinforcing member secured to a lower surface of a portion of the floor panel 3. The body 1 is formed at a back portion thereof with the above-mentioned door opening which is opened and closed by the back door 2. Reference character 5 in FIGS. 1 and 2 indicates a rear bumper. Moreover, the words "front" or "back" used in the present specification represent front or back on the basis of the direction of forward movement of the automobile, and reference character X in FIG. 2 indicates the direction thereof (shown also in FIG. 6 to FIG. 10).

As shown in FIG. 2, the back door 2 includes an outer panel 6 positioned at the outer side of the body and an inner panel 7 positioned on the inner side of the body inwardly of the outer panel 6 and secured to the outer panel 6.

Figure 3A:
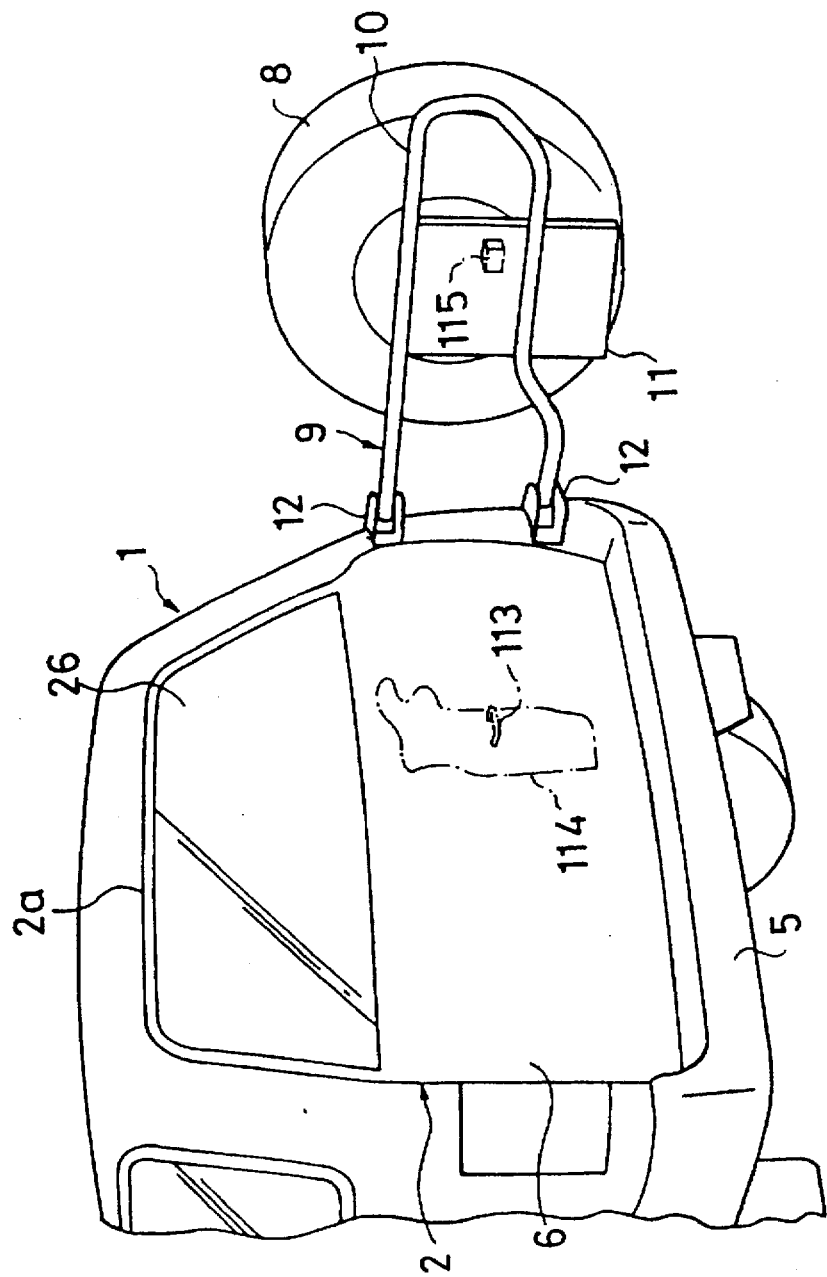
FIG. 3a is a perspective view of a prior art spare tire carrier.
Figure 3B:
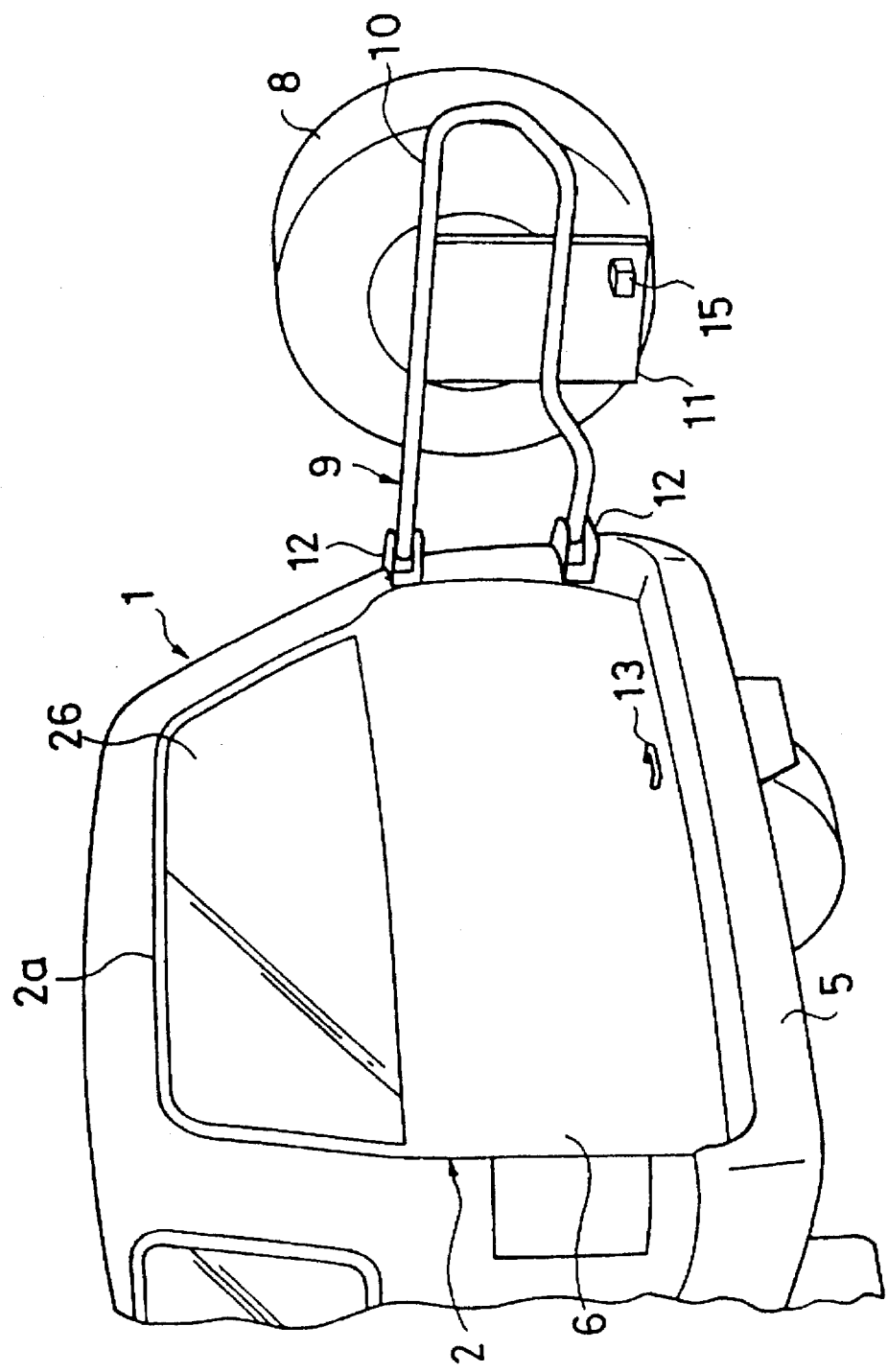
FIG. 3b is a perspective view showing the external appearance when the spare tire carrier shown in FIG. 1 holds an opened position.

At the back of the back door 2 is positioned a spare tire carrier 9 which detachably supports a spare tire 8. The spare tire carrier 9, shown as an example in the drawing, comprises a carrier body 10 made of a pipe, as is clearly shown in FIG. 3, and a supporting plate 11 fixed to the above-mentioned mentioned carrier body 10. The base end of the carrier body 10 is supported pivotably in the horizontal direction on the outer surface of the back side of the body 1 by way of a pair of hinges 12, 12. This spare tire carrier 9 usually is held in the closed position adjacent the back of the back door 2 existing in the closed position, as shown in FIGS. 1 and 2. Further, when the back door 2 is opened and closed, the spare tire carrier 9 is pivotally moved from the closed position to the opened position so that it does not prevent the opening and closing operation of the back door 2, as shown in FIG. 3. In this way, the spare tire carrier 9 is pivotably supported on the body 1 so that it can be pivotally moved for the opening and closing operation between the closed position shown in FIGS. 1 and 2 and the opened position shown in FIG. 3.

When the spare tire carrier 9 is in the closed position, it is necessary to lock it firmly to the back door 2. To that end, in the prior art, as shown by a chain line in FIG. 3, a carrier lock reinforcement 114, to which a carrier striker 113 is fixed, is secured to the outer surface of the outer panel 6 constituting the outer plate of the back door 2 and, simultaneously, a carrier lock device 115 is fixed to the spare tire carrier 9, as shown by a chain line in FIG. 3, so that when the spare tire carrier 9 is brought into the closed position, the carrier lock device 115 and the carrier striker 113 engage to thereby lock the spare tire carrier 9 in its closed position. Since, at that time, a large load is applied from the spare tire carrier 9 to the carrier striker 113, as explained before, the carrier lock reinforcement 114 supporting the striker 113 is made large in size, to strongly reinforce the outer panel 6 and to distribute the load acting on the outer panel 6, thereby preventing the panel 6 from being permanently deformed. However, use of such large-sized carrier lock reinforcement 114 results in an increase in the entire weight of the automobile as well as an increase in cost.

In the present embodiment, as shown in FIG. 2, a carrier lock reinforcement 14, to which the carrier striker 13 is fixed, is secured to the upper surface of the inner panel part 7a constituting the lower side portion of the back door. The carrier striker 13 protrudes backwardly from the back door 2. In the embodiment shown in FIG. 2, the carrier striker 13 is passed through a hole 30 formed in the outer panel 6 of the back door 2.

Figure 4:
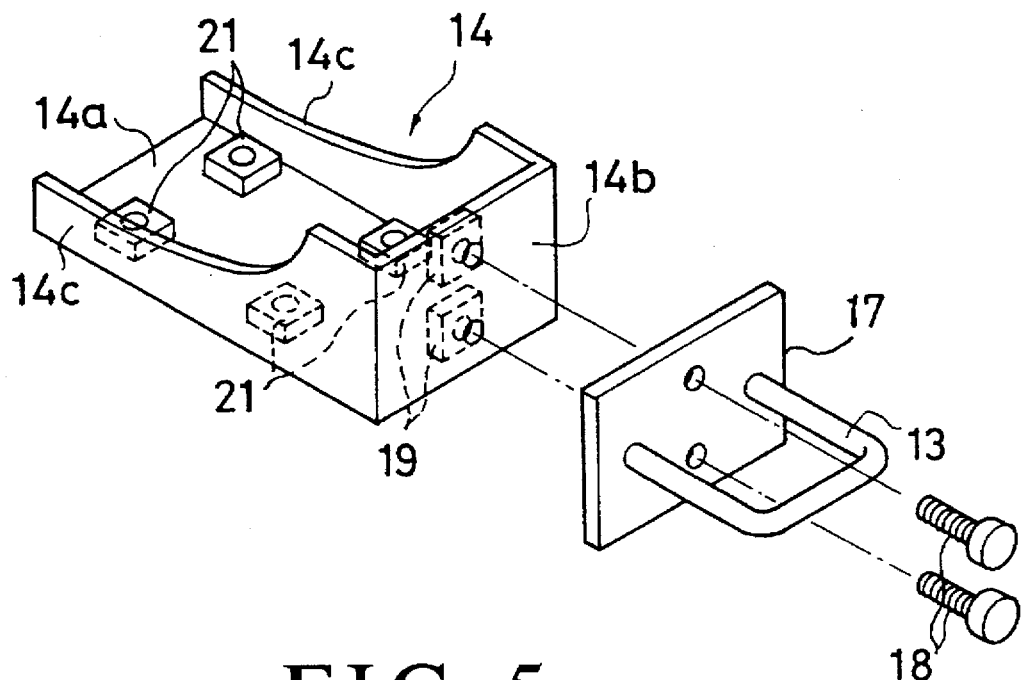
FIG. 4 is a perspective view of a carrier lock reinforcement.

As shown in FIG. 4, the carrier lock reinforcement 14 includes a bottom wall 14a, a back wall 14b integrally provided at the back portion of the bottom wall 14a in an upright position, and side walls 14c, 14c integrally provided at both sides of the bottom wall 14a in upright positions, and is made of a high strength material, for example, steel plate. The bottom wall 14a of the carrier lock reinforcement 14 is secured to the upper surface of the inner panel part 7a, for example, by means of welding.

A carrier striker 13 is substantially U-shaped, as shown in FIG. 4, and is integrally secured at a base end thereof to a base plate 17, which in turn is connected integrally to the back wall 14b of the carrier lock reinforcement 14, for example, by bolts 18 and nuts 19. Thus, in the present embodiment, the carrier striker 13 is fixed to the carrier lock reinforcement 14 by way of the base plate 17, however, it may be directly fixed thereto.

Meanwhile, in a portion of the spare tire carrier 9 corresponding to the above-mentioned carrier striker 13 is further provided a carrier lock device 15, as shown in FIG. 2. When the spare tire carrier 9 is held in the closed position, the carrier lock device 15 engages the above-mentioned carrier striker 13 associated with the back door 2 to thereby lock the spare tire carrier 9 in its closed position. When a lever (not shown) is operated to unlock the carrier lock device 15, the spare tire carrier 9 may be pivotally moved to the opened position shown in FIG. 3.

The inner panel part 7a extends substantially in the horizontal direction and is short in the length thereof in the front and back direction. The lower end of the inner panel part 7a being strongly fixed to the lower end of the outer panel 6. This makes the rigidity of the inner panel part 7a considerably high. In the present embodiment, the carrier lock reinforcement 14 is secured to the inner panel part 7a.

According to the above-mentioned construction, when the spare tire carrier 9 is held in the closed position, a large load is applied from the spare tire carrier 9 to the carrier striker 13 by way of the carrier lock device 15. However, since the carrier lock reinforcement 14 is fixed to the inner panel part 7a having high rigidity, the back door 2 is prevented from being permanently deformed by the load. Thus, a small-sized piece member such as the reinforcement 14 may be used. An external force from the spare tire carrier 9 acts on the carrier striker 13 substantially in the horizontal direction by way of the carrier lock device 15. The external force directed horizontally is applied to the inner panel part 7a by way of the carrier lock reinforcement 14. Since the inner panel part 7a is also positioned substantially in the horizontal direction, it displays high rigidity to the external force directed horizontally.

As described above, the carrier lock reinforcement 14 serves to reinforce the back door 2 so that when a load is applied to the back door 2 from the spare tire carrier 9, permanent deformation of the back door 2 due to such a load does not occur. The carrier lock reinforcement 14 is secured to the inner panel part 7a of the back door 2 which is high in rigidity and strength; so, in the case where the carrier lock reinforcement 14 is made small in size, permanent deformation of the back door due to the load can be prevented. Thus, use of the smaller-sized carrier lock reinforcement 14 allows the cost thereof and the weight of the automobile to be reduced, thereby enabling the disadvantage in the prior art to be simply eliminated. Moreover, since the carrier lock reinforcement 14 is positioned at the lower portion of the back door 2, there is no danger of the window pane 26 interfering with the reinforcement 14.

Hereupon, when the back door 2 is closed, as shown in FIG. 2, it is necessary to lock the back door 2 relative to the body 1. To that end, a door lock device 22 has hitherto been associated with the back door 2, and when the back door 2 is held in the closed position, the door lock device 22 engages the door striker 23 fixed to the body 1 to thereby lock the back door 2 in the closed position. Unlocking the back door 2 allows pivotal movement of the back door 2 for the opening and closing operation thereof.

Figure 5:
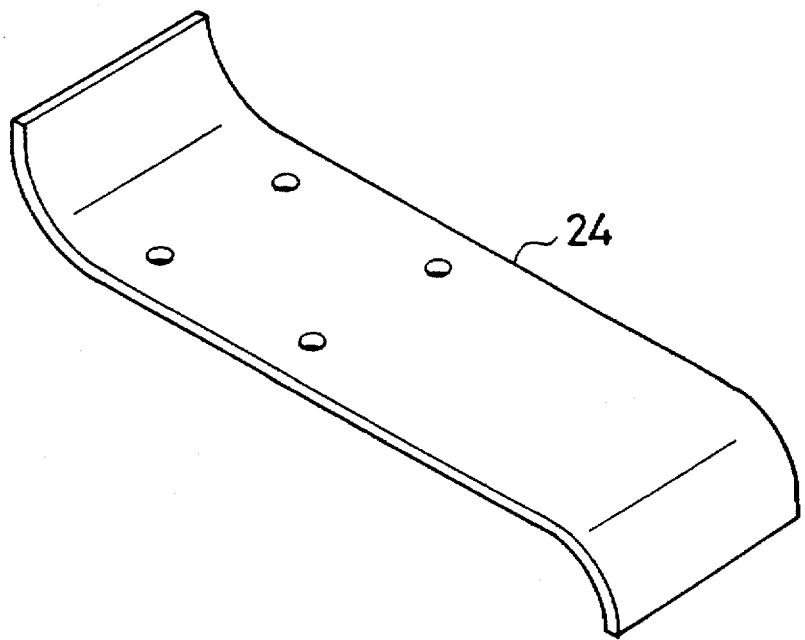
FIG. 5 is a perspective view of a door lock reinforcement.

A large load is applied to the portion of the back door to which the door lock device 22 is attached, particularly when the door lock device 22 engages or disengages the door striker 23. Therefore, to the upper surface of the inner panel part 7a is secured a door lock reinforcement 24, also shown in FIG. 5 which is for example, secured by welding and to which in turn the door lock device 22 is fixed. Thus, the door lock reinforcement 24 reinforces the portion of the back door subjected to the load from the door lock device 22, thereby preventing permanent deformation of the portion of the back door. Further, the door striker 23, in the present embodiment, is integrally secured to a striker base 25 attached to the rear wall surface of the cross sill.

Hereupon, if the embodiment shown in FIG. 2 is called a first embodiment, this first embodiment includes the carrier lock reinforcement 14 and the door lock reinforcement 24 spaced apart from each other in the direction of the width of the body, each being separately secured to the inner panel part 7a of the back door 2.

Figure 6:
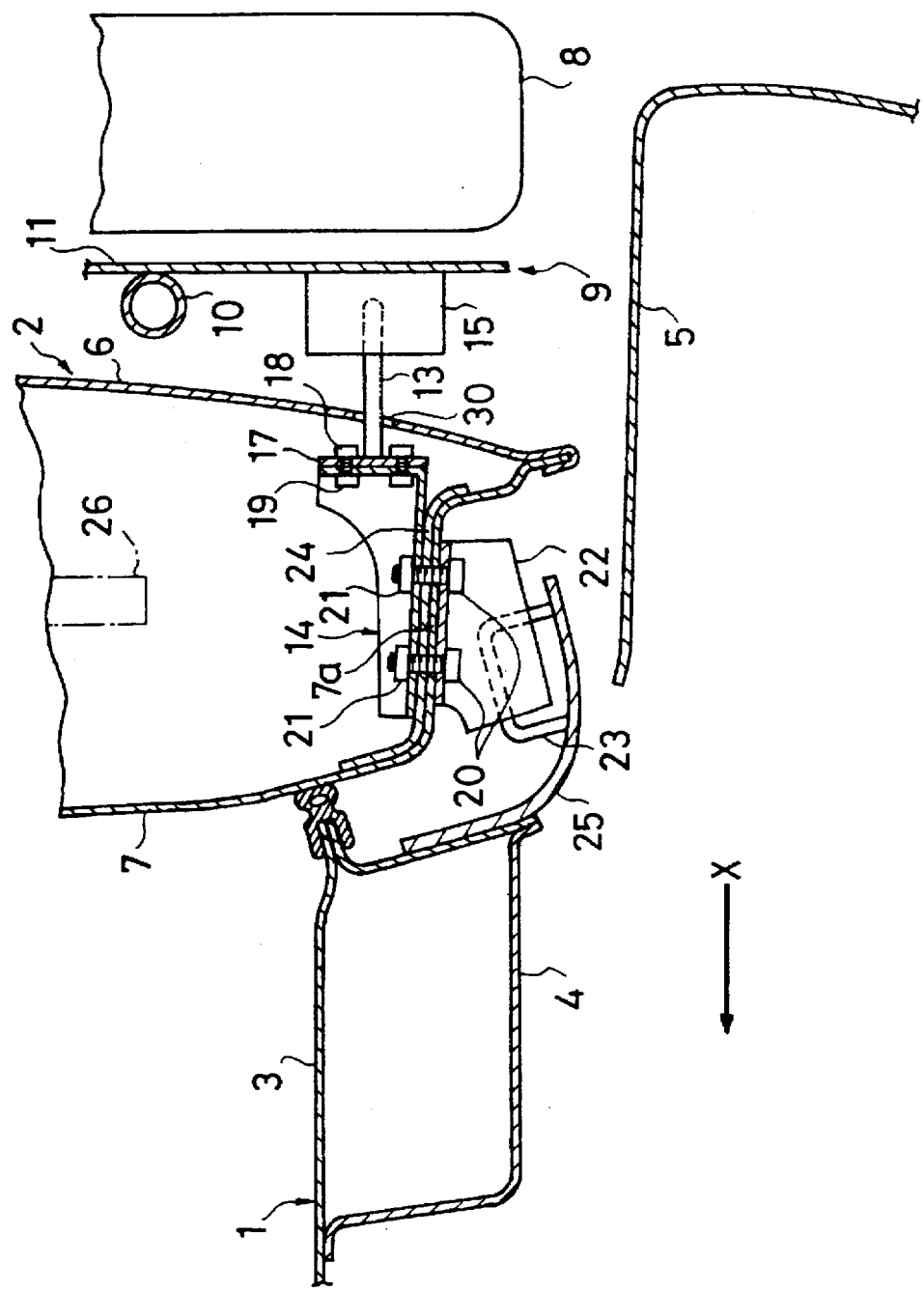
FIG. 6 is a sectional view similar to FIG. 2, showing a second embodiment of the present invention.

In a second embodiment of the present invention shown in FIG. 6, to the door lock reinforcement 24 secured to the inner panel part 7a is integrally secured the carrier lock reinforcement 14, to which the carrier striker 13 is fixed, for example, by welding. In addition, the door lock device 22 is fixed to both the door lock reinforcement 24 and the carrier lock reinforcement 14. For example, the door lock device 22 is fixed to both reinforcements 14, 24 in such a way that nuts 21 (not shown in FIG. 2) are left secured, by welding, to the bottom wall 14a of the carrier lock reinforcement 14, as shown in FIG. 4, and bolts 20 shown in FIG. 6 are inserted into the holes provided in the door lock device 22, inner panel part 7a, door lock reinforcement 24 and carrier lock reinforcement 14, until the bolts 20 are threadably engaged by the above-mentioned nuts 21.

The other construction of the second embodiment shown in FIG. 6 remains substantially unchanged compared with the above-mentioned first embodiment shown in FIGS. 1 to 5, and the fact that the carrier striker 13, fixed to the carrier lock reinforcement 14, projects backwardly when the back door 2 is held in the closed position, remains unchanged. Namely, the carrier striker 13 is passed through the hole 30 formed in the outer panel 6 of the back door 2 and extends backwardly of the back door 2 which is held in the closed position. When the spare tire carrier 9 is held in the closed position, the carrier lock device 15 of the spare tire carrier 9 engages the striker 13 to thereby lock the spare tire carrier 9.

Since, according to the above-mentioned construction, the carrier lock reinforcement 14 is secured to the high strength door lock reinforcement 24 to reinforce the back door 2, a load applied from the spare tire carrier 9 thereto can be received more firmly. Even where the carrier lock reinforcement 14 is made smaller, permanent deformation of the back door 2 is prevented. Further, the following advantages can be obtained.

When the back door 2 is closed, as shown in FIG. 6, the door lock device 22 engages the door striker 23 so that the back door 2 is connected to the body 1 by way of these elements 22, 23. In the embodiment shown in FIG. 6, since the carrier lock reinforcement 14 is integrally secured to the door lock reinforcement 24 to which the door lock device 22 is fixed, a load applied from the spare tire carrier 9 to the carrier striker 13, when the back door 2 is closed and the spare tire carrier 9 is brought into the closed position, is transmitted to the body 1 by way of the base plate 17, carrier lock reinforcement 14, door lock reinforcement 24, door lock device 22, striker 23 and striker base 25. Namely, the load applied to the carrier striker 13 is transmitted through the door lock device 22 and the like to the body 1 in a direct way, and can be received by the body 1 which is high in strength. Thus, in the case where the door lock reinforcement 24 is made smaller, deformation of the back door 2 is prevented, thereby enabling a reduction in the weight and cost of the automobile.

Figure 7:
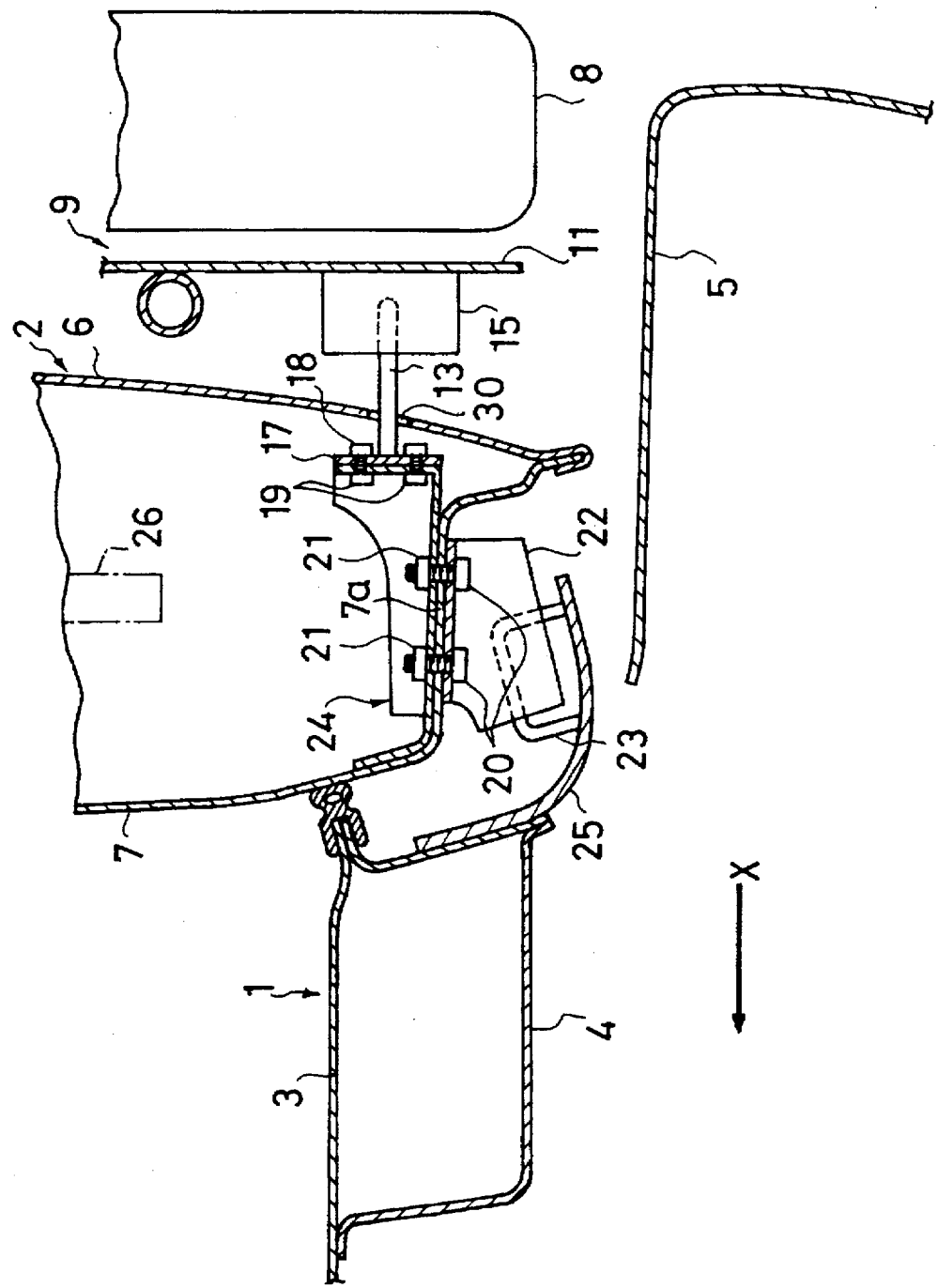
FIG. 7 is a sectional view similar to FIG. 2, showing a third embodiment of the present invention.

In a third embodiment shown in FIG. 7, the door lock reinforcement 24 and carrier lock reinforcement 14 shown in FIG. 6 are integrally formed into one piece. Namely, in the third embodiment, to the inner panel part 7a, constituting the lower side portion of the back door 2, is secured the door lock reinforcement 24, for example, by welding. To the door lock reinforcement 24 is fixed the door lock device 22 by means of bolts 20 and nuts 21 and the base plate 17 of the carrier striker 13 by means of bolts 18 and nuts 19. In this way, the door lock device 22 and the carrier striker 13 are fixed together to the door lock reinforcement 24.

The remaining structure in the third embodiment remains substantially unchanged in comparison with the embodiment shown in FIG. 6, and the fact that the carrier striker 13 projects backwardly, i.e., the carrier striker 13 is passed through the hole 30 of the outer panel 6 and projects backwardly of the back door 2, remains unchanged. When the back door 2 and the spare tire carrier 9 are closed, the carrier striker 13 engages the carrier lock device 15 of the spare tire carrier 9 to thereby lock the spare tire carrier 9 in its closed position.

The third embodiment shown in FIG. 7 allows a reduction in the number of parts in addition to the effects offered by the second embodiment shown in FIG. 6.

In the first to third embodiments shown in FIG. 2, FIG. 6 and FIG. 7, the carrier striker 13 is made to project backwardly of the back door 2 by passing the carrier striker 13 through the hole 30 provided in the outer panel 6 of the back door 2.

Figure 8:
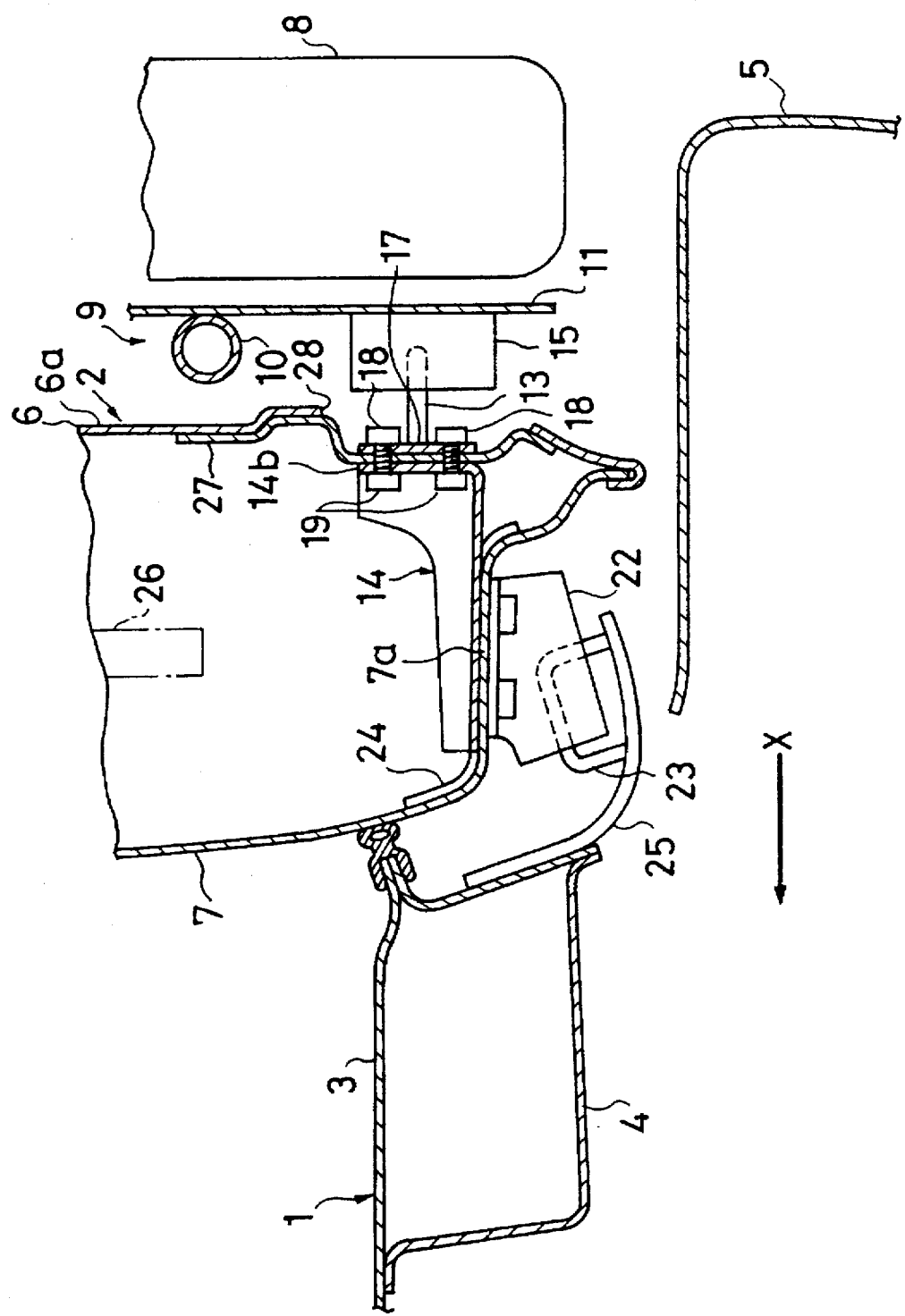
FIG. 8 is a sectional view similar to FIG. 2, showing a fourth embodiment of the present invention.
Figure 9:
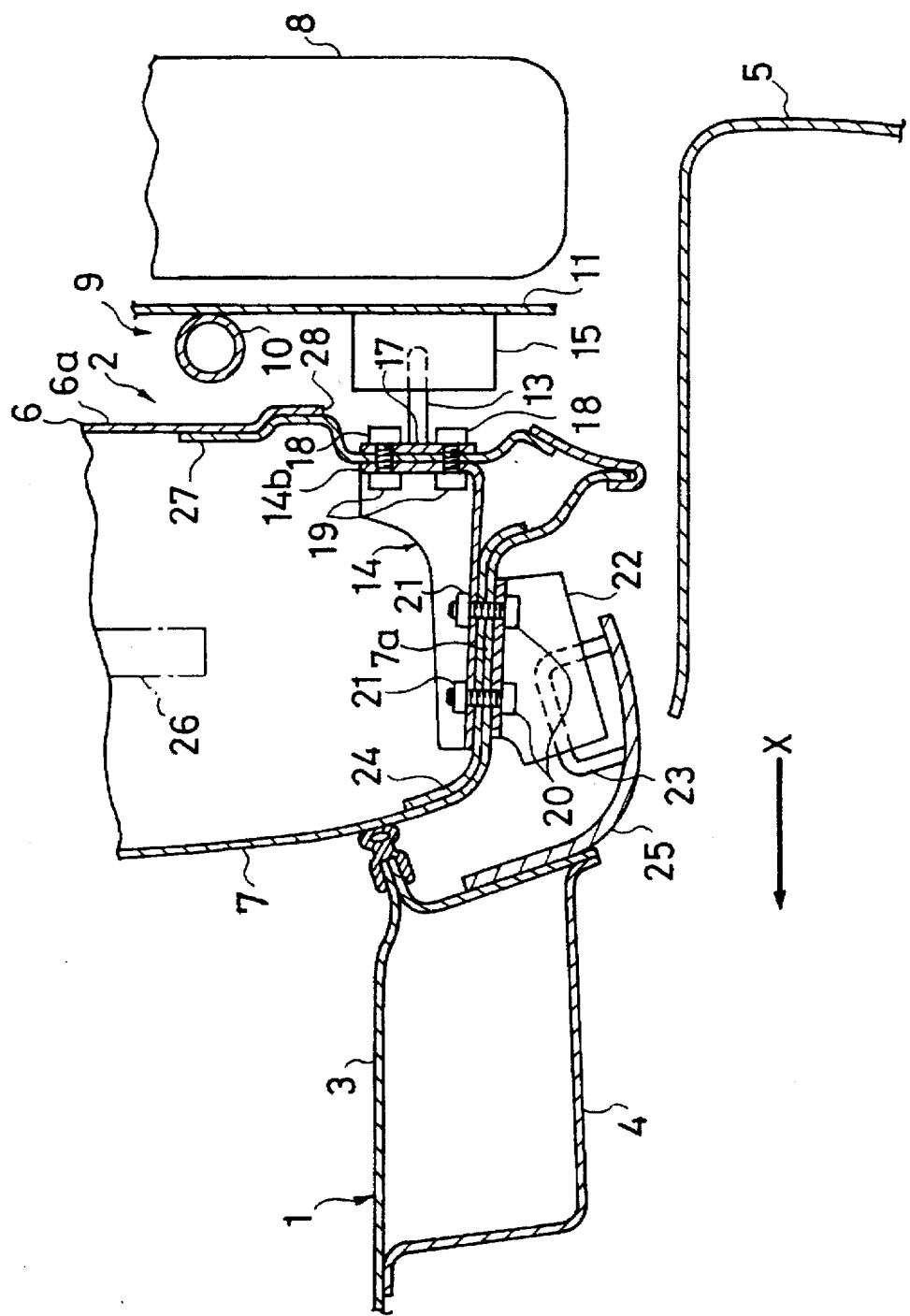
FIG. 9 is a sectional view similar to FIG. 2, showing a fifth embodiment of the present invention.
Figure 10:
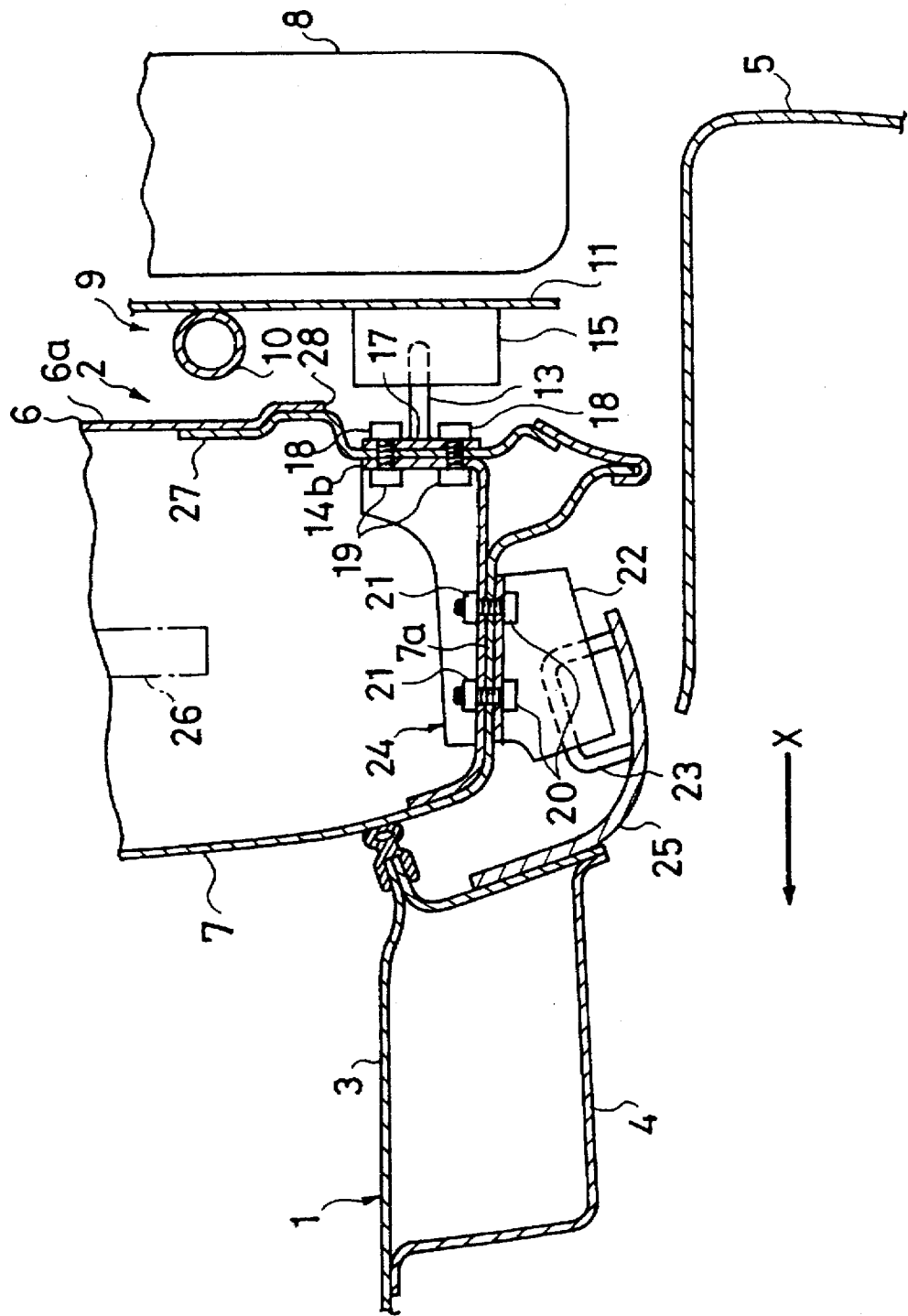
FIG. 10 is a sectional view similar to FIG. 2, showing a sixth embodiment of the present invention.

On the contrary, in fourth to sixth embodiments shown in FIGS. 8 to 10, respectively, a through-hole 28 is formed in the lower portion of the back door 2 and an outer panel reinforcement 27, for example, made of steel plate is arranged so as to close the through-hole 28. Namely, in these embodiments, the outer panel 6 of the back door 2 includes a body 6a and the outer panel reinforcement 27 disposed over the through-hole 28 formed in the body 6a. The peripheral portion of said reinforcement 27 is integrally secured to the outer panel body 6a, for example, by welding.

The back end 14b of the carrier lock reinforcement 14 (FIG. 8 and FIG. 9) or of the door lock reinforcement 24 (FIG. 10) and the base plate 17, to which the carrier striker 13 is secured, are arranged at the front side (the interior side of the back door) and the back side of the above-mentioned outer panel reinforcement 27, respectively, so that they sandwich the center portion of the outer panel reinforcement 27 therebetween, and they are strongly fixed by means of the nuts 19 and bolts 18 threadably connected thereto. In this way, the base plate 17 is fixed to the outer surface of the outer panel reinforcement 27 constituting a part of the outer panel 6, so that the carrier striker 13 extends backwardly. Each of the embodiments shown in FIGS. 8 to 10, does not have carrier striker 13 passing through the holes 30 provided in the back panel 6 as shown in FIGS. 2, 6 and 7, but instead have the carrier striker 13 fixed to the outer surface of the back panel 6 and extending backwardly of the outer surface of the panel 6.

As described above, in the embodiments shown in FIGS. 8 to 10, the outer panel 6 includes the outer panel body 6a provided with a through-hole 28 in the lower portion of the back door 2 and the outer panel reinforcement 27, which is positioned so as to close the through-hole 28 of the body 6a, is secured to the outer panel body 6a. In the embodiments shown in FIGS. 8 and 9, the carrier lock reinforcement 14 positioned in the inner side of the back door and the carrier striker 13 positioned at the outer side of the back door are arranged so as to sandwich the outer panel reinforcement 27 therebetween, with the carrier striker 13, carrier lock reinforcement 14 and outer panel reinforcement 27 being fixed to each other. Further, in the embodiment shown in FIG. 10, the door lock reinforcement 24 positioned at the inner side of the back door and carrier striker 13 positioned at the outer side of the back door are arranged so as to sandwich the outer panel reinforcement 27 therebetween, with the carrier striker 13, door lock reinforcement 24 and outer panel reinforcement 27 being fixed to each other.

The other construction of the fourth embodiment shown in FIG. 8 remains substantially unchanged in comparison with the first embodiment shown in FIGS. 1 to 5. Accordingly, the same reference characters as those in FIG. 2 are affixed to the same parts in FIG. 8 as those in FIG. 2, and the explanation thereof is omitted.

Further, the other construction of a fifth embodiment shown in FIG. 9 remains substantially unchanged in comparison with the second embodiment shown in FIG. 6. Accordingly, the same reference characters as those in FIG. 6 are affixed to the same parts in FIG. 9 as those in FIG. 6, and the explanation thereof is omitted.

Moreover, the other construction of the sixth embodiment shown in FIG. 10 remains substantially unchanged in comparison with the third embodiment shown in FIG. 7. Accordingly, the same reference characters as those in FIG. 7 are affixed to the same parts in FIG. 10 as those in FIG. 7, and the explanation thereof is omitted.

In the first to third embodiments shown in FIG. 2, FIG. 6 and FIG. 7, a load applied from the spare tire carrier 9 to the carrier striker 13 is transmitted to the inner panel part 7a by way of the carrier lock reinforcement 14 or the door lock reinforcement 24. Therefore, the load is not immediately applied to the outer panel 6. On the contrary, in the fourth to sixth embodiments shown in FIGS. 8 to 10, a load applied from the spare tire carrier 9 to the carrier striker 13 is partly transmitted to the outer panel body 6a by way of the outer panel reinforcement 27. Namely, a part of this load is transmitted to the outer panel 6. This means that the load is transmitted to the inner panel part 7a and the outer panel 6 in a distributed way, so that the carrier lock reinforcement 14 or the door lock reinforcement 24 can be made smaller in size and lighter in weight, thereby enabling an effective reduction in the cost of the automobile.

In the embodiments shown in FIGS. 8 to 10, the through-hole 28 is provided in the outer panel body 6a and the outer panel reinforcement 27 is secured over the through-hole 28. This arrangement may be modified in such a way that the lower portion of the outer panel 6 is held between the base plate 17 of the carrier striker 13 and the back wall 14b of the carrier lock reinforcement 14 or the door lock reinforcement 24 in a similar way to FIGS. 8 to 10, without providing the through-hole 28 and the outer panel reinforcement 27, these elements being integrally connected by means of bolts 18 and nuts 19. This construction also enables the same effects as those in the embodiments shown in FIGS. 8 to 10 to be offered. Also, in this case, the carrier striker extends backwardly.

In the above-mentioned modification of FIGS. 8 and 9, the carrier striker 13 positioned at the outer side of the back door and the carrier lock reinforcement 14 positioned at the inner side of the back door are located with the outer panel 6 held therebetween, said carrier striker 13, outer panel 6 and carrier lock reinforcement 14 being fixed to each other.

Further, in the above-mentioned modification of FIG. 10, the carrier striker positioned on the outer side of the back door and the door lock reinforcement positioned on the inner side of the back door are positioned so as to hold the outer panel therebetween, and the above-described carrier striker, outer panel and door lock reinforcement 24 are fixed to each other.

In each of the embodiments shown in FIGS. 8 to 10, the carrier striker 13 extends backwardly of the outer surface of the outer panel of the back door 2 which is held in the closed position; however, the relative position between the carrier striker 13 and the outer panel 6 may be set so that the entire carrier striker 13 is retracted from the outer surface of the outer panel of the back door 2, which is held in the closed position, toward the interior side of the back door 2, i.e.; toward the front side.

The embodiments of the present invention applied to the automobile, in which the back door 2 is pivotably connected at the upper part 2a thereof to the body 1, have been explained, however, the present invention can be applied also to an automobile in which the back door is pivotably connected at the lateral part or the lower part thereof to the body.

We claim:

1. An automobile comprising:
   a body having a back door pivotably supported on said body for pivotal movement between a closed position where a door opening defined by a back portion of said body is closed and an opened position where said door opening is opened;
   said back door including an outer panel, an inner panel and a bottom panel defining an inner cavity of said back door;
   a spare tire carrier pivotably supported on said body for movement between a closed position adjacent to said back door when said back door is in said closed position thereof and an opened position permitting opening and closing of said back door;
   a carrier striker;
   a carrier lock reinforcement member fixed to said bottom panel, said carrier lock reinforcement member supporting said carrier striker such that said carrier striker protrudes rearwardly from said outer panel; and
   said spare tire carrier having a carrier lock device for engaging said carrier striker and securing said spare tire carrier in said closed position thereof.

2. The automobile according to claim 1 wherein said inner panel and said bottom panel are integrally formed.

3. An automobile comprising
   a body having a back door pivotably supported on said body for pivotal movement between a closed position where a door opening defined by a back portion of said body is closed and an opened position where said door opening is opened;
   said back door including an outer panel, an inner panel and a bottom panel defining an inner cavity of said back door;
   a spare tire carrier pivotably supported on said body for movement between a closed position adjacent to said back door when said back door is in said closed position thereof and an opened position permitting opening and closing of said back door;
   a carrier striker;
   a carrier lock reinforcement member fixed to said bottom panel, said carrier lock reinforcement member supporting said carrier striker such that said carrier striker protrudes rearwardly from said outer panel;
   said spare tire carrier having a carrier lock device for engaging said carrier striker and securing said spare tire carrier in said closed position thereof;
   said outer panel defining a through-hole at a lower portion of said outer panel;
   an outer panel reinforcement member fixed to said outer panel and closing said through-hole of said outer panel; and
   said carrier lock reinforcement member being disposed within said inner cavity, said outer panel reinforcement member being interposed between said carrier lock reinforcement member and said carrier striker, and said carrier striker, said carrier lock reinforcement member and said outer panel reinforcement member being mutually secured.

4. An automobile comprising:
   a body having a back door pivotably supported on said body for pivotal movement between a closed position where a door opening defined by a back portion of said body is closed and an opened position where said door opening is opened;
   said back door including an outer panel, an inner panel and a bottom panel defining an inner cavity of said back door;
   a spare tire carrier pivotably supported on said body for movement between a closed position adjacent to said back door when said back door is in said closed position thereof and an opened position permitting opening and closing of said back door;
   a carrier striker;
   a carrier lock reinforcement member fixed to said bottom panel, said carrier lock reinforcement member supporting said carrier striker such that said carrier striker protrudes rearwardly from said outer panel;
   said spare tire carrier having a carrier lock device for engaging said carrier striker and securing said spare tire carrier in said closed position thereof; and
   said carrier striker and said carrier lock reinforcement member having said outer panel interposed therebetween, and said carrier striker, said outer panel and said carrier lock reinforcement member being mutually secured.

5. An automobile comprising:
   a body having a back door pivotably supported on said body for pivotal movement between a closed position where a door opening defined by a back portion of said body is closed and an opened position where said door opening is opened;
   said back door including an outer panel, an inner panel and a bottom panel defining an inner cavity of said back door;
   a spare tire carrier pivotably supported on said body for movement between a closed position adjacent to said back door when said back door is in said closed position thereof and an opened position permitting opening and closing of said back door;
   a carrier striker;
   said back door having a door lock device and said body having a door striker, said door lock device and said door striker being aligned to engage one another when said back door is in the closed position to thereby lock said back door;
   a door lock reinforcement member fixed to said bottom panel to provide reinforced support for said door lock device;
   a carrier lock reinforcement member coupled to said door lock reinforcement member and said bottom panel, said carrier lock reinforcement member supporting said carrier striker such that said carrier striker protrudes rearward of said outer panel, said door lock device being coupled to said door lock reinforcement member and said carrier lock reinforcement member; and
   said spare tire carrier having a carrier lock device for engaging said carrier striker and securing said spare tire carrier in said closed position thereof.

6. An automobile as claimed in claim 5, wherein said outer panel defines a through-hole at a lower portion of said outer panel, and said automobile further comprises:

an outer panel reinforcement member fixed to said outer panel and closing said through-hole of said outer panel; and said carrier lock reinforcement member being disposed within said inner cavity, said outer panel reinforcement member being interposed between said carrier lock reinforcement member and said carrier striker, and said carrier striker, said carrier lock reinforcement member and said outer panel reinforcement member being mutually secured.

7. An automobile as claimed in claim 5, wherein both said carrier striker and said carrier lock reinforcement member have said outer panel interposed therebetween, and said carrier striker, said outer panel and said carrier lock reinforcement member being mutually secured.

8. The automobile according to claim 5 wherein said inner panel and said bottom panel are integrally formed.

9. An automobile comprising:

a body having a back door pivotably supported on said body for pivotal movement between a closed position where a door opening defined by a back portion of said body is closed and an opened position where said door opening is opened;

said back door including an outer panel, an inner panel and a bottom panel defining an inner cavity of said back door;

a spare tire carrier pivotably supported on said body for movement between a closed position adjacent to said back door when said back door is in said closed position thereof and an opened position permitting opening and closing of said back door;

a carrier striker;

said back door having a door lock device and said body having a door striker, said door lock device and said door striker being aligned to engage one another when said back door is in the closed position to thereby lock said back door;

a door lock reinforcement member fixed to said bottom panel to provide reinforced support for said door lock device;

said door lock reinforcement member supporting said carrier striker such that said carrier striker protrudes rearward of said outer panel; and said spare tire carrier having a carrier lock device for engaging said carrier striker and securing said spare tire carrier in said closed position thereof.

10. An automobile as claimed in claim 9, wherein said outer panel defines a through-hole at a lower portion of said outer panel, and said automobile further comprises:

an outer panel reinforcement member fixed to said outer panel and closing said through-hole of said outer panel; and said carrier lock reinforcement member being disposed within said inner cavity and said outer panel reinforcement member being interposed between said carrier lock reinforcement member and said carrier striker, and said carrier striker, said carrier lock reinforcement member and said outer panel reinforcement member being mutually secured.

11. An automobile as claimed in claim 9, wherein both said carrier striker and said carrier lock reinforcement member have said outer panel interposed therebetween, and said carrier striker, said outer panel and said carrier lock reinforcement member are mutually secured.

12. The automobile according to claim 9 wherein said inner panel and said bottom panel are integrally formed.

13. An automobile which comprises:

a body having a back door pivotably supported on said body for pivotal movement between a closed position where a door opening defined by a back portion of said body is closed and an opened position where said door opening is opened;

said back door including an outer panel and a bottom panel defining an inner cavity of said back door, said outer panel defining an aperture in a lower portion of said outer panel;

a spare tire carrier pivotably supported on said body for movement between a closed position adjacent to said back door when said back door is in said closed position thereof and an opened position permitting opening and closing of said back door;

a carrier striker;

a carrier lock reinforcement member within said inner cavity and fixed to said bottom panel, said carrier lock reinforcement member supporting said carrier striker such that said carrier striker protrudes through said aperture in said outer panel and rearwardly from said outer panel; and said spare tire carrier having a carrier lock device for engaging said carrier striker and securing said spare tire carrier in said closed position thereof.

* * * * *